(12) United States Patent

Hickey et al.

(10) Patent No.: US 12,562,428 B2

(45) Date of Patent: Feb. 24, 2026

(54) METHOD AND APPARATUS FOR A MULTI-CELL RECHARGEABLE ENERGY STORAGE DEVICE

(71) Applicant: GM GLOBAL TECHNOLOGY OPERATIONS LLC, Detroit, MI (US)

(72) Inventors: Ryan P. Hickey, Austin, TX (US); Hunter G. Rimatzki, Clawson, MI (US); Evan D. Griffith, Pleasant Ridge, MI (US); Phillip D. Hamelin, Clarkston, MI (US); Alexander M. Bilinski, Avoca, MI (US); Michael V. Pyrtko, Ferndale, MI (US); Tyler Talaski, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 517 days.

(21) Appl. No.: 18/167,312

(22) Filed: Feb. 10, 2023

(65) Prior Publication Data

US 2024/0274972 A1     Aug. 15, 2024

(51) Int. Cl.
| | |
|---|---|
| *H01M 50/367* | (2021.01) |
| *H01M 10/613* | (2014.01) |
| *H01M 10/625* | (2014.01) |
| *H01M 10/643* | (2014.01) |
| *H01M 10/653* | (2014.01) |
| *H01M 10/6557* | (2014.01) |
| *H01M 10/6566* | (2014.01) |
| *H01M 10/6567* | (2014.01) |
| *H01M 10/658* | (2014.01) |

(Continued)

(52) U.S. Cl.
CPC ....... *H01M 50/367* (2021.01); *H01M 10/613* (2015.04); *H01M 10/625* (2015.04); *H01M 10/643* (2015.04); *H01M 10/653* (2015.04); *H01M 10/6557* (2015.04); *H01M 10/6566* (2015.04); *H01M 10/658* (2015.04); *H01M 50/213* (2021.01); *H01M 50/249* (2021.01); *H01M 10/6567* (2015.04); *H01M 2220/20* (2013.01)

(58) Field of Classification Search
CPC ............ H01M 50/367; H01M 50/213; H01M 50/249; H01M 50/507; H01M 10/613; H01M 10/625; H01M 10/643; H01M 10/653; H01M 10/6557; H01M 10/6566; H01M 10/658; H01M 10/6567; H01M 10/6556; H01M 2220/20
See application file for complete search history.

(56) References Cited

U.S. PATENT DOCUMENTS

2021/0167343 A1*  6/2021  Kwag  ............... H01M 10/4257

* cited by examiner

*Primary Examiner* — Eugenia Wang
(74) *Attorney, Agent, or Firm* — Quinn IP Law

(57) ABSTRACT

A method for assembling a rechargeable energy storage system includes assembling a plurality of cell modules into an upper structure of an enclosure, wherein the plurality of cell modules are composed of a plurality of battery cells and a plurality of collectors, wherein the plurality of collectors are arranged to electrically connect the battery cells; inverting the enclosure including the plurality of cell modules assembled therein; filling the enclosure with a liquified potting compound; curing the liquified potting compound to form a solidified potting compound; and assembling a bottom structure onto the upper structure of the enclosure to form a plurality of longitudinal channels.

11 Claims, 5 Drawing Sheets

(51) Int. Cl.
    *H01M 50/213*         (2021.01)
    *H01M 50/249*         (2021.01)

METHOD AND APPARATUS FOR A MULTI-CELL RECHARGEABLE ENERGY STORAGE DEVICE

INTRODUCTION

Rechargeable energy storage devices and systems may be employed in a stationary energy storage system or in a mobile device, e.g., as part of an electric vehicle (EV). When employed as part of an EV, an electrified powertrain employs one or multiple electric machines to generate torque employing energy derived at least in part from the rechargeable energy storage device, with the generated torque being delivered to a drivetrain for tractive effort.

SUMMARY

There is a need for a multi-cell rechargeable energy storage device and/or system that has a hybrid orientation of electrical and thermal systems to enable efficient cell integration, achieve electrical energy storage requirements, and fit within allowable packaging dimensions, along with other features that may be achieved by such an arrangement.

The concepts described herein provide for a multi-cell rechargeable energy storage device and/or system, employable on-vehicle, that has a plurality of vertically oriented cylindrical electrochemical battery cells (battery cells), wherein the plurality of cylindrical-shaped battery cells are disposed in an enclosure, and wherein the plurality of cylindrical-shaped battery cells are arranged in a plurality of cell modules. A plurality of longitudinally oriented collectors are arranged to electrically connect the cylindrical-shaped battery cells arranged in the plurality of cell modules.

An aspect of the disclosure may include an enclosure that includes an upper structure, bottom structure, and a vent. A header is formed on a first end of the enclosure between the upper structure and the bottom structure. A plurality of vertically oriented cylindrical electrochemical battery cells (battery cells), are arranged in a plurality of longitudinally oriented rows in the upper structure of the enclosure, wherein each of the plurality of battery cells has an upper portion and a bottom portion. A cell tray includes a plurality of first ridges and a plurality of second ridges, the plurality of first ridges projecting vertically upwardly from the cell tray and disposed around the battery cells, the plurality of second ridges projecting vertically downwardly from the cell tray. A potting compound encapsulates the upper portion of the plurality of battery cells within the upper structure of the enclosure. The bottom structure includes a planar sheet having a plurality of longitudinally oriented vertical ridges formed thereon. The plurality of longitudinally oriented vertical ridges of the bottom structure are joined to the plurality of second ridges projecting vertically downwardly from the cell tray to form a plurality of channels. The header is fluidly coupled to the plurality of channels, and the vent is fluidly coupled to the plurality of channels via the header.

Another aspect of the disclosure may include having each of the plurality of channels corresponding to one of the plurality of longitudinally oriented rows of the plurality of battery cells.

Another aspect of the disclosure may include having each of the plurality of channels being formed between the potting compound that encapsulates the upper portions of the plurality of battery cells and the bottom structure of the enclosure, wherein the upper portion of each of the plurality of battery cells includes a cell vent for pressure relief.

Another aspect of the disclosure may include the potting compound being, in an uncured state, a low viscosity, liquified, self-leveling substance that is fabricated from one of polyurethane, silicon, epoxy, or another polymer substance.

Another aspect of the disclosure may include the plurality of battery cells being arranged into a plurality of cell modules; a plurality of end collectors arranged on first and second sides of the enclosure; a positive device terminal and a negative device terminal; and an electric power bus arranged in a longitudinally oriented spine, wherein the electric power bus includes a plurality of first busbars and a second busbar. The plurality of first busbars, the second busbar, and the plurality of end collectors are arranged to electrically connect the plurality of cell modules in series between the positive device terminal and the negative device terminal. A thermal management system includes first and second fluidic manifolds that are fluidly coupled to a plurality of longitudinally oriented heat exchange plates. The plurality of longitudinally oriented heat exchange plates are arranged to physically contact a portion of an outer surface of the plurality of battery cells.

Another aspect of the disclosure may include the plurality of first busbars, the second busbar, and the plurality of end collectors being arranged in a serpentine configuration to electrically connect the plurality of cell modules in series between the positive device terminal and the negative device terminal.

Another aspect of the disclosure may include a plurality of cell monitoring controllers being arranged to monitor the plurality of cell modules; wherein each of the plurality of cell monitoring controllers is arranged to monitor electrical parameters and environmental parameters of a respective one of the plurality of cell modules.

Another aspect of the disclosure may include the battery cells of one of the plurality of cell modules being arranged into a plurality of subsets that are arranged in parallel, wherein one of the plurality of longitudinally oriented collectors is arranged to electrically connect a first of the plurality of subsets of the battery cells to the second of the plurality of subsets of the battery cells.

Another aspect of the disclosure may include the plurality of longitudinally oriented heat exchange plates being arranged to physically contact the portion of the outer surface of the plurality of battery cells to thermally couple to the plurality of battery cells.

Another aspect of the disclosure may include the plurality of longitudinally oriented vertical ridges formed in the bottom structure corresponding to the plurality of longitudinally oriented heat exchange plates.

Another aspect of the disclosure may include a method for assembling a rechargeable energy storage system that includes assembling a plurality of cell modules into an upper structure of an enclosure, wherein the plurality of cell modules are composed of a plurality of battery cells and a plurality of collectors, wherein the plurality of collectors are arranged to electrically connect the battery cells; inverting the enclosure including the plurality of cell modules assembled therein; filling the enclosure with a liquified potting compound; curing the liquified potting compound to form a solidified potting compound; and assembling a bottom structure onto the upper structure of the enclosure to form a plurality of longitudinal channels.

Another aspect of the disclosure may include re-inverting the enclosure subsequent to the assembling of the bottom structure onto the upper structure of the enclosure.

Another aspect of the disclosure may include filling the enclosure with the liquified potting compound and verifying that the liquified potting compound encapsulates a specific desired upper portion of the plurality of battery cells of the plurality of cell modules within the enclosure.

Another aspect of the disclosure may include verifying that the liquified potting compound encapsulates the upper portion of the plurality of battery cells of the plurality of cell modules within the enclosure by visually inspecting a fill height of the liquified potting compound to verify that the liquified potting compound encapsulates the upper portion of the plurality of battery cells of the plurality of cell modules within the enclosure.

Another aspect of the disclosure may include filling the enclosure to a level that encapsulates the upper portions of the plurality of battery cells.

Another aspect of the disclosure may include filling the enclosure to a level that encapsulates the upper portions of the plurality of battery cells and the bottom portions of the plurality of battery cells.

Another aspect of the disclosure may include curing the liquified potting compound to form the solidified potting compound by exposing the liquified potting compound to ambient air.

Another aspect of the disclosure may include curing the liquified potting compound to form the solidified potting compound by exposing the liquified potting compound to a temperature greater than ambient air temperature.

Another aspect of the disclosure may include curing the liquified potting compound to form the solidified potting compound by exposing the liquified potting compound to ultraviolet light.

Another aspect of the disclosure may include a vehicle having a rechargeable energy storage system electrically connected to an electric drive system coupled to a propulsion unit, wherein the rechargeable energy storage system is as described herein.

The above summary is not intended to represent every possible embodiment or every aspect of the present disclosure. Rather, the foregoing summary is intended to illustrate some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
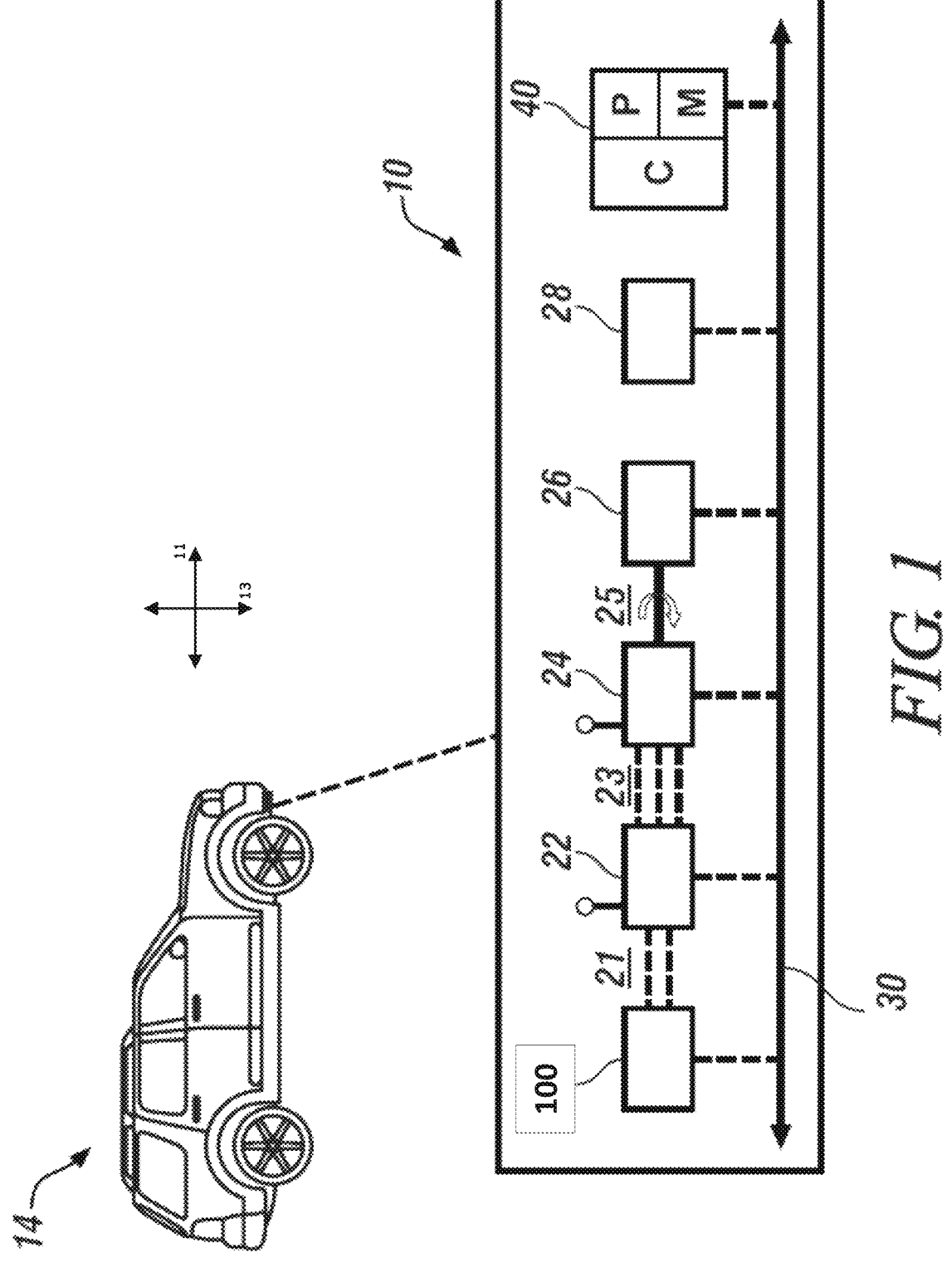
FIG. 1 schematically illustrates a vehicle including a rechargeable energy storage device, in accordance with the disclosure.

The present disclosure is susceptible to various modifications and alternative forms, and some representative embodiments have been shown by way of example in the drawings and will be described in detail herein. Novel aspects of this disclosure are not limited to the forms illustrated in the drawings. Rather, the disclosure is intended to cover modifications, equivalents, combinations, or alternatives falling within the spirit and scope of the disclosure as defined by the appended claims.

DETAILED DESCRIPTION

The following detailed description is merely illustrative in nature and is not intended to limit the application and uses. Furthermore, the drawings are in simplified form and are not to precise scale. For purposes of convenience and clarity, directional terms such as top, bottom, left, right, up, over, above, below, beneath, rear, and front, and similar expressions are employed for description, and are not to be construed to limit the scope of the disclosure.

Furthermore, the disclosure, as illustrated and described herein, may be practiced in the absence of an element that is not specifically disclosed herein.

The use of ordinals such as first, second and third does not imply a ranked sense of order, but rather may distinguish between multiple instances of an act or structure.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Throughout the drawings, the various elements may be described in context of a longitudinal axis 11, a lateral axis 12, and/or a vertical axis 13.

Referring to the drawings, wherein like reference numbers refer to like components, FIG. 1 schematically illustrates an electric drive system 10 arranged to supply tractive torque to a vehicle 14. Operation of the electric drive system 10 is controlled by a controller C 40. The electric drive system 10 may be an electric drive system or a hybrid drive system that employs one or multiple rotary electric machines to generate mechanical torque. The vehicle 14 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Alternatively, the electric drive system 10 may be arranged to supply torque to a stationary system. It is to be understood that the electric drive system 10 may take many different forms and have additional components. A longitudinal dimension of the vehicle 14 defines the longitudinal axis 11, a lateral dimension of the vehicle 14 defines the lateral axis 12, and a vertical dimension of the vehicle 14 defines the vertical axis 13.

The electric drive system 10 includes a DC power source such as a rechargeable energy storage unit (battery) 100. The electric drive system 10 includes a power inverter 22 and rotary electric machine 24. The rechargeable energy storage system 100 is electrically connected to the power inverter 22 via a high-voltage DC power bus 21, and the power inverter 22 is connected to the rotary electric machine 24 via electrical conductors 23. The rotary electric machine 24 is mechanically coupled to a propulsion unit 26 via a rotatable member 25. The rechargeable energy storage system 100 may be a traction battery pack for generating high-voltage power that may be directed to the propulsion unit 26, via the rotary electric machine 24, and for operating other electrical systems 28 in the vehicle 14. The rechargeable energy storage system 100 may include battery cells of different chemistries. In one example, the power inverter 22 is a three-phase three-wire voltage-source inverter. In some embodiments, the power inverter 22 may be part of a power inverter module of the electric vehicle 14. In order to generate tractive power with sufficient vehicle range and speed, the rechargeable energy storage system 100 in the electric vehicle 14 may be larger and higher in capacity than a nominal 12-volt starting, lighting, and ignition battery. In such an instance, the electric drive system 10 is a high-voltage electric drive system 10. Sensors and other monitoring elements (not shown) may be arranged to monitor electrical parameters (e.g., voltage, current) at various locations, and mechanical parameters (e.g., speed) at various other locations.

The rechargeable energy storage system 100 is attached to an underbody portion of the vehicle 14 in one embodiment. The rechargeable energy storage system 100 is located between left and right front wheels in one embodiment. Alternatively, the rechargeable energy storage system 100 is located between left and right rear wheels in one embodiment. Alternatively, the rechargeable energy storage system 100 is located between the front and rear wheels in one embodiment.

Referring again to FIG. 1, the rotary electric machine 24 electrically connects to the rechargeable energy storage system 100 via the high-voltage DC power bus 21 and the power inverter 22. The power inverter 22 is configured with control circuits including power transistors, e.g., IGBTs for transforming high-voltage DC electric power to high-voltage AC electric power and transforming high-voltage AC electric power to high-voltage DC electric power. The power inverter 22 may employ pulsewidth-modulating (PWM) control of the IGBTs to convert stored DC electric power originating in the rechargeable energy storage system 100 to AC electric power to drive the rotary electric machine 24 to generate torque. Similarly, the power inverter 22 converts mechanical power transferred to the rotary electric machine 24 to DC electric power to generate electric energy that is storable in the rechargeable energy storage system 100, including as part of a regenerative braking control strategy. The power inverter 22 receives motor control commands and controls inverter states to provide the motor drive and regenerative braking functionality. In one embodiment, a DC/DC electric power converter electrically connects to the high-voltage DC power bus 21 to provide electric power to a low-voltage battery via a low-voltage bus. The low-voltage battery electrically connects to an auxiliary power system to provide low-voltage electric power to low-voltage systems on the vehicle, including, e.g., electric windows, HVAC fans, seats, and other devices. The controller 40 is operatively connected to the power inverter 22 to control transfer of electric power between the rechargeable energy storage system 100 and a plurality of radially oriented electrically conductive windings of a stator of the rotary electric machine 24. The controller 40 controls the power inverter 22 to sequentially electrically activate electrically conductive windings to exert a rotating magnetic force on a rotor of the rotary electric machine 24 to effect rotation, or to react torque to retard rotation during regenerative operation.

Motors, generators, and other types of electric machines are often embodied as alternating current (AC) torque-generating devices. When the rotary electric machine is energized by a direct current (DC) voltage from a multi-cell battery pack or other DC power supply, a power inverter produces a desired polyphase AC output voltage. For example, a three-phase AC power inverter uses three separate phase inverters each having semiconductor switching components, e.g., IGBTs, MOSFETs, or thyristors. The on/off states of the switching components for a given electrical phase are controlled to produce the desired AC output voltage. The AC output voltage is thereafter supplied to a corresponding phase winding of the rotary electric machine.

Referring again to FIG. 1, the electric drive system 10 includes controller C 40 having a processor P and memory M that have been adapted to regulate the operation of various onboard systems and components in the vehicle 14. The controller C 40 is communicatively connected with the power inverter 22 to control the rotary electric machine 24 to control bi-directional transfer of energy between the rechargeable energy storage system 100 and the rotary electric machine 24 in either a motoring mode or a regenerative mode. The rotary electric machine 24 may operate using a three-phase AC current. In such an instance, the power inverter 22 is governed by the controller C 40 to convert the DC voltage (provided by the rechargeable energy storage system 100) to a three-phase AC voltage for use by the rotary electric machine 24 to generate torque when operating in the motoring mode. In the regenerative mode, the power inverter 22 converts AC power from the rotary electric machine 24 to DC power compatible with and storable on the rechargeable energy storage system 100. It is understood that the electric drive system 10 may include additional components not shown.

The various components of the electric drive system 10 may be in communication with the controller C 40 (and each other) via a wireless network 30, which may be a short-range network or a long-range network. Additionally, the various components of the electric drive system 10 may include physical wired connections. The wireless network 30 may be a communication BUS, which may be in the form of a serial Controller Area Network (CAN-BUS). The wireless network 30 may incorporate a Bluetooth™ connection, a Wireless Local Area Network (LAN) which links multiple devices using a wireless distribution method, a Wireless Metropolitan Area Network (MAN) which connects several wireless LANs or a Wireless Wide Area Network (WAN). Other types of connections may be employed.

The controller C 40 is programmed to receive a torque command in response to an operator input (e.g., through an accelerator pedal or brake pedal) or an automatically fed input condition monitored by the controller C 40. Upon receipt of the torque command, the controller C 40 is programmed to transmit a command signal to the power inverter 22 to regulate a transfer of electrical power between the rechargeable energy storage system 100 and the rotary electric machine 24. One technique employed to obtain a variable frequency, variable voltage or variable power from a power inverter 22 operating from a fixed voltage DC power source, such as the rechargeable energy storage system 100 is the pulse width modulation ("PWM" hereinafter) technique. The switching frequency of the PWM signal determines how fast the PWM completes a cycle, and therefore how fast it switches between high and low states. In other words, the PWM switching frequency corresponds to the rate at which the DC voltage is switched on and off during the PWM process in a switching power supply. There are various PWM techniques which may be implemented, such as for example, sinusoidal PWM (SPWM), space vector PWM (SVPWM), zero-vector modulation (ZVM) and discontinuous PWM (DPWM). These techniques differ in terms of their voltage linearity range, ripple voltage/current, switching losses, and high frequency common mode voltage or current properties.

Figure 2:
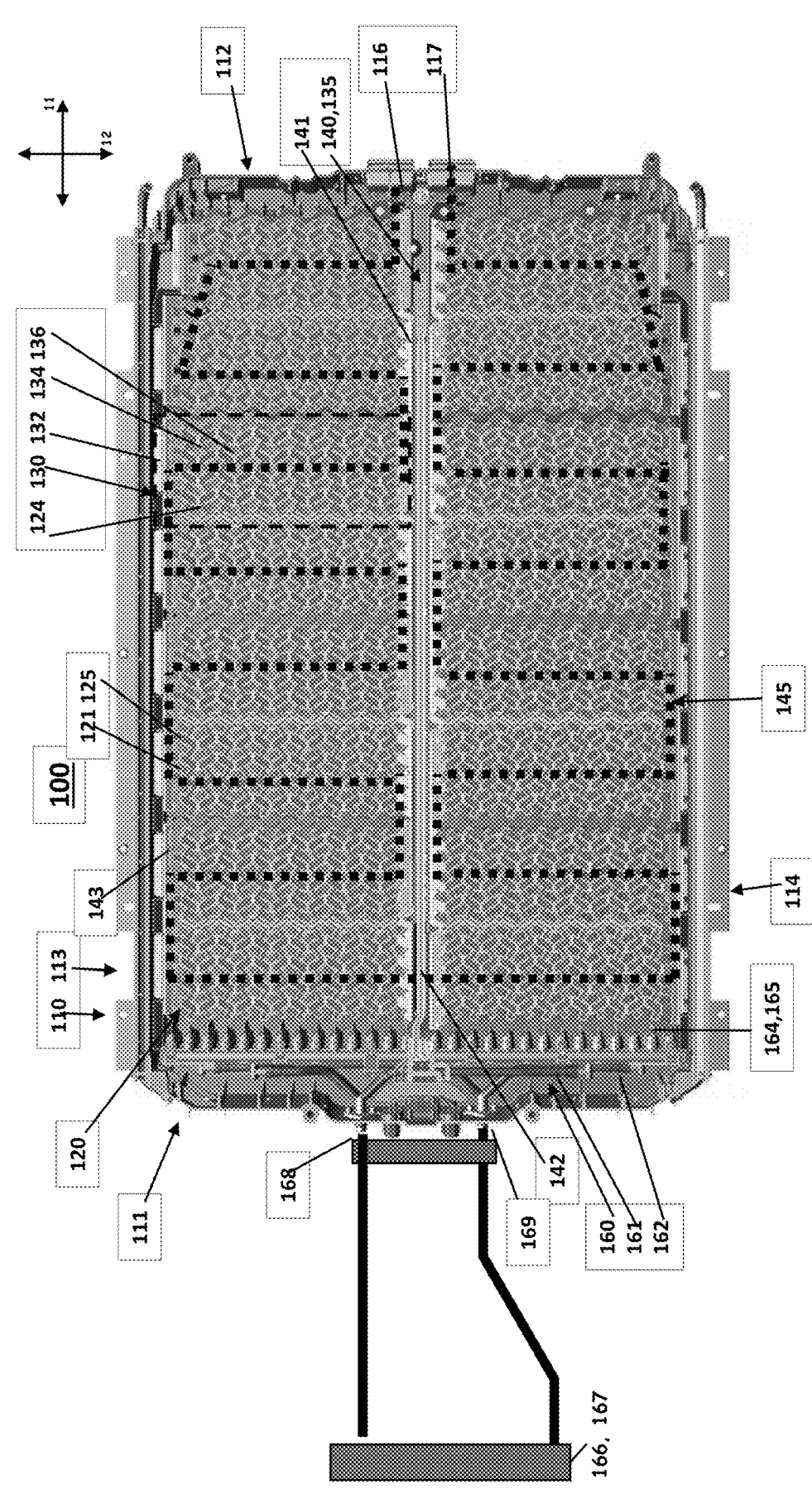
FIG. 2 illustrates a cutaway top view of an embodiment of the rechargeable energy storage system, in accordance with the disclosure.
Figure 3:
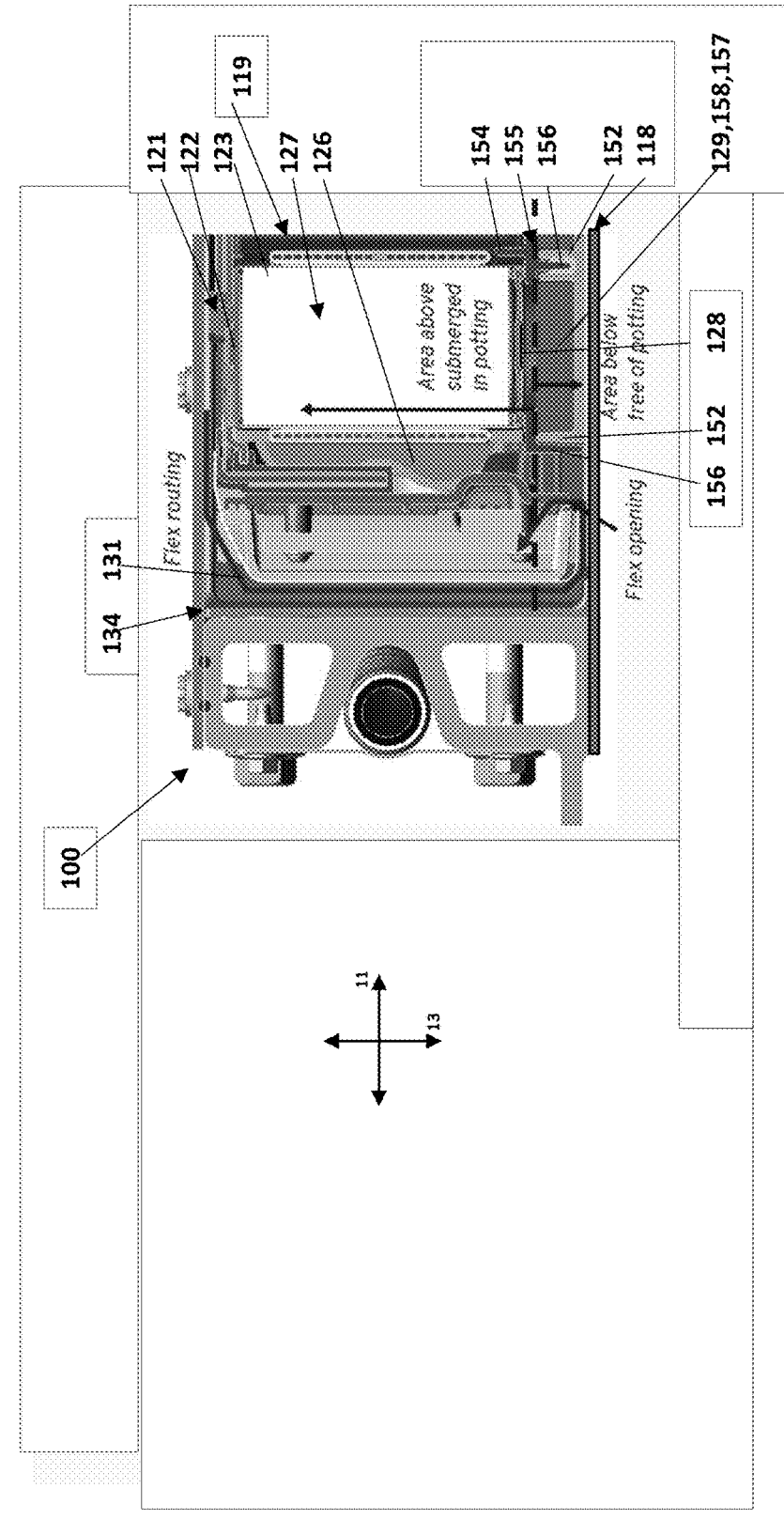
FIG. 3 illustrates a partial cutaway side view of a portion of an embodiment of the rechargeable energy storage system, in accordance with the disclosure.
Figure 4:
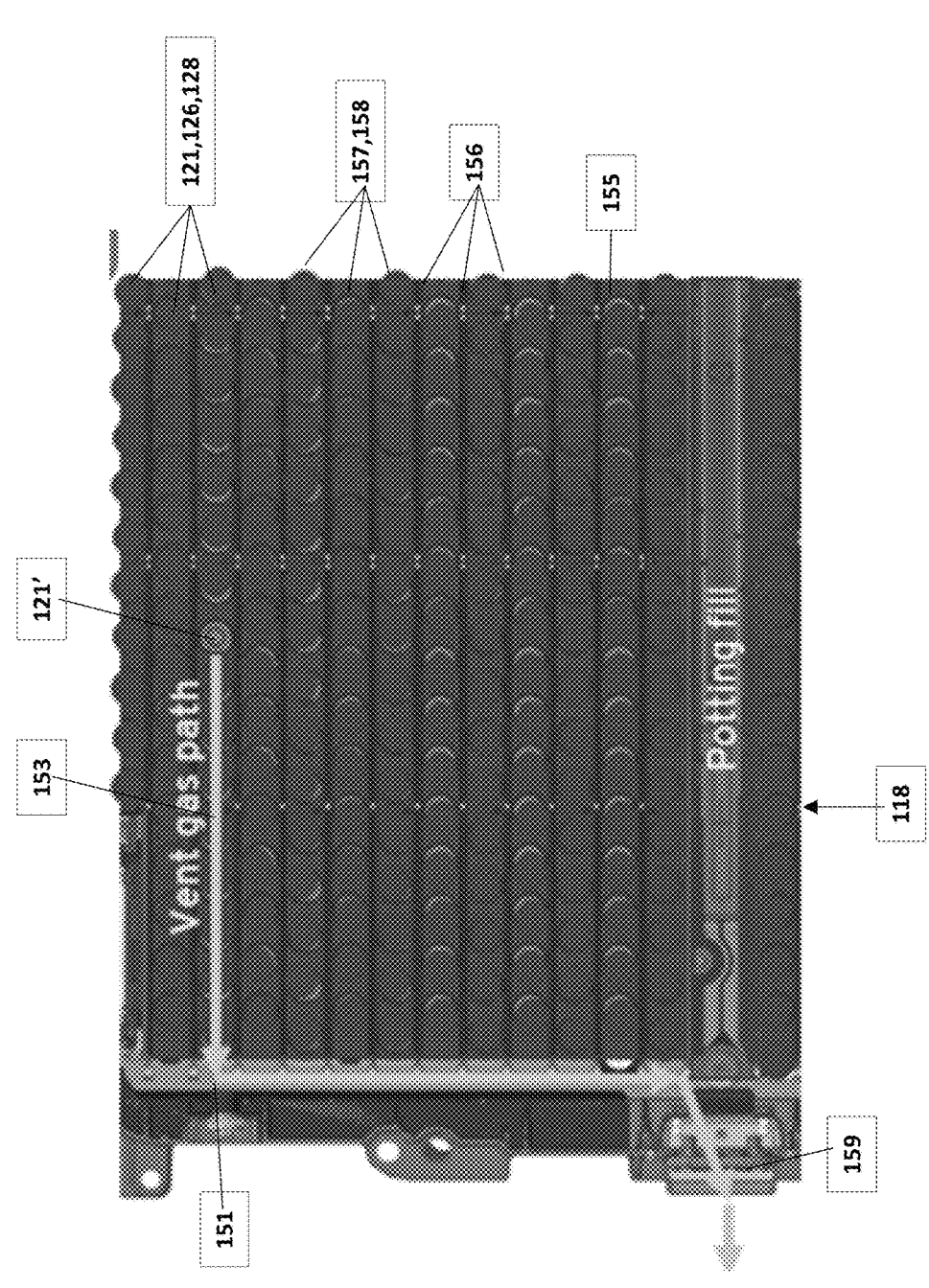
FIG. 4 illustrates a partial cutaway bottom view of a portion of an embodiment of the rechargeable energy storage system, in accordance with the disclosure.

FIGS. 2, 3 and 4 schematically illustrate elements of an embodiment of the rechargeable energy storage system 100 that is described with reference to FIG. 1. The rechargeable energy storage system 100 is composed of an electrical power system 120 and a thermal management system 160 that are arranged in an enclosure 110. The electrical power system 120 is composed of a plurality of vertically oriented, cylindrically shaped battery cells 121 that are arranged into a plurality of cell modules 130 and disposed in the enclosure 110. The plurality of cell modules 130 are symmetrically arranged around a longitudinally oriented spine 135 that is centrally located in the enclosure 110 in the lateral direction.

Referring again to FIG. 2, the enclosure 110 is a rectangularly shaped prismatic device that provides a housing and mounting for various elements of the rechargeable energy storage system 100. The enclosure 110 may be arranged as an assembled device having an upper structure 119 and a bottom structure 118 (illustrated in FIG. 3). The upper structure 119 includes first and second ends 111, 112, respectively, first and second sides 113, 114, respectively, and a top structure (not illustrated). The upper structure 119 may be a single molded or otherwise fabricated device, or an assembled device. The bottom structure 118 is a flat or mostly flat planar panel that is sealably assembled onto the upper structure 119. When assembled, the enclosure 110 environmentally sealably contains the contents therein. The first end 111 may be arranged on a nominal front of the vehicle 14 described with reference to FIG. 1, the second end 112 may be arranged on a nominal rear of the vehicle 14, the first side 113 may be arranged on a rightward side of the vehicle 14, and the second side 114 may be arranged on a leftward side of the vehicle 14.

The plurality of vertically oriented, cylindrically shaped battery cells 121 are advantageously arranged into a plurality of longitudinally oriented rows 157, as illustrated with reference to FIG. 4. The plurality of longitudinally oriented rows 157 of the battery cells 121 combine with a corresponding plurality of upwardly projecting ridges 152 of a bottom structure 118 to form a plurality of longitudinal channels 158. A fluidic header 151 is formed in a void area on the first end 111 of the enclosure 110 between the upper structure 119 and the bottom structure 118, and includes a vent 159, which enables outgassing to ambient air under certain conditions. The fluidic header 151 is fluidly coupled to a plurality of longitudinal channels 158 that are formed as described herein. As shown with reference to FIG. 3, the bottom structure 118 includes the plurality of upwardly projecting ridges 152, which correspond to the plurality of longitudinally oriented rows 157 associated with the arrangement of the plurality of vertically oriented, cylindrically shaped battery cells 121.

Referring again to FIG. 2, The thermal management system 160 includes first and second fluidic manifolds 161, 162, respectively, that are fluidly coupled to a plurality of longitudinal heat exchange plates 164, and are also fluidly coupled to an external heat exchanger 166, e.g., a liquid/air heat exchanger. A fluidic pump 167 circulates a liquid coolant between the plurality of longitudinal heat exchange plates 164 and the external heat exchanger 166. A fluidic heating device may be incorporated to provide supplemental heat to the liquid coolant.

The plurality of longitudinal heat exchange plates 164 are ribbon-shaped cooling plates having first and second flow couplers 168, 169, respectively, that couple to internal flow channels 165. The arrangement of the first and second flow couplers 168, 169 and internal flow channel 165 on each of the longitudinal heat exchange plates 164 facilitates a down-and-back circulation of the coolant. The first and second flow couplers 168, 169 fluidly couple to a respective one of the first and second fluidic manifolds 161, 162 to effect flow of coolant through the internal flow channels 165. The plurality of longitudinal heat exchange plates 164 extend longitudinally from the first fluidic manifold 161 and are interleaved between adjacent pairs of the battery cells 121 to physically contact and thus thermally couple to the outer surfaces of the plurality of cylindrical-shaped battery cells 121. As arranged, and as shown with reference to FIG. 2, each of the battery cells 121 physically contacts and thus thermally couples to two of the longitudinal heat exchange plates 164. The thermal management system 160 thermally interacts with the plurality of battery cells 121 to remove heat or add heat thereto.

The thermal management system 160 is designed for overall structural integration into the rechargeable energy storage system 100 and hardware integration efficiency with a low profile design. This arrangement with the first and second fluidic manifolds 161, 162 being arranged on the first end 111 of the enclosure 110 means that there is little or no effect on packaging of the enclosure 110 on the first and second sides 113, 114, or the second end 112 or the corners. The first and second fluidic manifolds 161, 162, are sized and design to provide balanced flow of coolant through the longitudinal heat exchange plates 164 of the thermal management system 160 while minimizing packaging space. The longitudinal arrangement is also readily scalable to accommodate enclosures 110 for variants that have different lengths or widths, and also accommodate variants in height or diameters of the cylindrical-shaped battery cells 121.

Referring again to FIG. 2, the rechargeable energy storage system 100 is arranged as a rechargeable electrochemical energy storage device, and the plurality of cylindrical-shaped battery cells 121 may be composed as lithium manganese, lithium-ion phosphate, lithium cobalt, lithium-nickel based cells, by way of non-limiting examples. Each of the cylindrical-shaped battery cells 121 includes a positive terminal 122 and a negative terminal 123, as indicated with reference to FIG. 3.

Electrical connectivity between a positive device terminal 116 and a negative device terminal 117 is achieved employing an electric power bus 140 that includes a plurality of first interconnect board (ICB) busbars 141 and a second ICB busbar 142, and a plurality of end collectors 143.

The electric power bus 140 is arranged in the longitudinally oriented spine 135 that is centrally located in the lateral direction, wherein the electric power bus 140 includes a plurality of the first ICB busbars 141 and the second ICB busbar 142.

The plurality of first ICB busbars 141, the second ICB busbar 142, and the plurality of end collectors 143 are arranged to electrically connect the plurality of cell modules 130 in series in a serpentine arrangement 145 between the positive device terminal 116 and the negative device terminal 117 to supply electrical power.

The cylindrical-shaped battery cells 121 are disposed in rows that are parallel to the longitudinal axis 11 to accommodate the plurality of longitudinal heat exchange plates 164 of the thermal management system 160. The cylindrical-shaped battery cells 121 are arranged into a plurality of cell modules 130 that are perpendicular to the longitudinal axis 11 and parallel to the lateral axis 12.

Each of the cell modules 130 includes a cell monitoring unit (CMU) 132, a SLA (sense line assembly) device 136, an interconnect board (ICB) 134, a plurality of the longitudinally oriented collectors 125 arranged in parallel to electrically connect the cylindrical-shaped battery cells 121, and a wiring harness and the plurality of sensors that monitor environmental and operational parameters of the battery cells 121.

The battery cells 121 of one of the plurality of cell modules 130 are arranged into a plurality of subsets 124 that are arranged in parallel, wherein one of the plurality of longitudinally oriented collectors 125 is arranged to electrically connect a first of the plurality of subsets 124 of the battery cells 121 to second of the plurality of subsets 124 of the battery cells 121. The SLA devices 136 connect to one of the end collectors 143 and one of the first ICB busbars 141.

A cell tray 155 includes a plurality of first ridges 154 and a plurality of second ridges 156, the plurality of first ridges 154 projecting vertically upwardly from the cell tray 155 and disposed around the battery cells 121, the plurality of second ridges 156 projecting vertically downwardly from the cell tray 155 when the rechargeable energy storage system 100 is arranged on-vehicle, i.e., is not inverted.

The CMU 132 includes a controller that communicates with a plurality of sensors that monitor environmental and operational parameters of the battery cells 121 and the cell module 130, including e.g., current, voltage, and temperature.

FIG. 3 schematically illustrates a partial cutaway portion of the rechargeable energy storage system 100, including one of the battery cells 121 having positive terminal 122 and negative terminal 123, ICB 134, and enclosure 110. An upper portion 127 of the battery cell 121 is encapsulated in a potting compound 126, and a bottom portion 128 of the battery cell 121 in a void area 129 that is defined by the potting compound 126 that encapsulates the upper portion 127 of the battery cell 121 and the enclosure 110. The upper portion 127 of each of the plurality of battery cells 121 includes a cell vent for pressure relief and to enable release of gases that may build up inside the enclosure. A cell vent mitigates and reduces effects of thermal runaway under some circumstances.

A flex routing design facilitates direct connection to the ICB 134 via a flexible printed circuit (FPC) 131 without compromising the seal created by the potting compound 126. This arrangement may be an element of a thermal runaway protection (TRP) strategy. The opening for the FPC 131 is outside the potting zone, and may serve as a gas sensing path.

The potting compound 126 includes, in an uncured state, a low viscosity, liquified, self-leveling substance that is fabricated from one of polyurethane or silicon and other materials. When in its liquified state, the potting compound 126 may be cured by exposure to ambient air, exposure to a temperature greater than the ambient air temperature, exposure to ultraviolet light, or another curing method. The potting compound 126, when solidified after curing, may add structural integrity to the pack.

FIG. 4 schematically illustrates a partial cutaway bottom view of a portion of an embodiment of the rechargeable energy storage system 100 described herein. The rechargeable energy storage system 100 includes the plurality of battery cells 121 being arranged in a plurality of longitudinally oriented rows 157, with the corresponding plurality of longitudinal channels 158, fluidic header 151, and vent 159. The illustration depicts the bottom portions 128 of the plurality of battery cells 121 being encased in the potting compound 126.

For purposes of illustration, the potting compound 126 has been removed from one of the battery cells, designated 121', such as may occur due to a fault in the respective battery cell 121' that may be caused by an internal fault, or overcharging, or overdischarging, or for another reason. A vent gas path 153 is organically created for channeling vented gas created by the fault in the respective battery cell 121', and includes the respective longitudinal channel 158, fluidic header 151, and vent 159.

Figure 5:
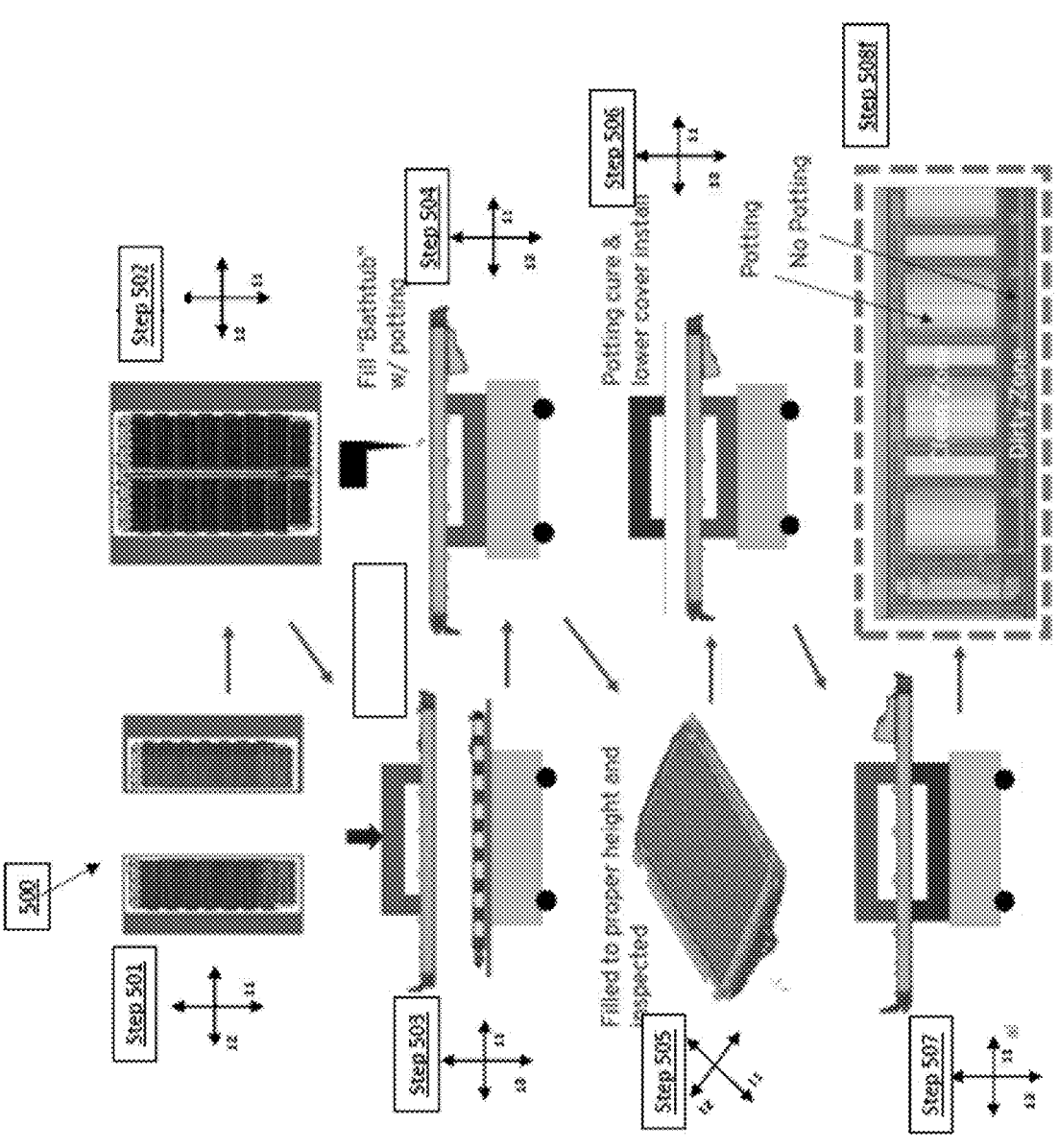
FIG. 5 schematically illustrates a process related to assembly of a rechargeable energy storage device, in accordance with the disclosure.

FIG. 5 schematically illustrates a process 500 related to assembly of an embodiment of the rechargeable energy storage system 100 that is described herein. The process 500 for assembling the rechargeable energy storage system 100 includes as follows. A plurality of the cell modules 130 are arranged in the upper structure 119 of the enclosure 110 with the plurality of battery cells 121 being arranged in a plurality of longitudinally oriented rows 157 (Steps 501, 502). This may include arranging half of the plurality of battery cells 121 in a first arrangement, and half of the plurality of battery cells 121 in a second arrangement (Step 501), and joining the aforementioned halves of the half of the plurality of battery cells 121 to the longitudinal heat exchange plates 164 of the thermal management system 160, the electric power bus 140, the spine 135, and other related elements (Step 502).

In one embodiment, the cell tray 155 is employed to arrange the plurality of battery cells 121 in the plurality of longitudinally oriented rows 157, which may be facilitated by the longitudinal heat exchange plates 164. Alternatively, the plurality of battery cells 121 are arranged in the plurality of longitudinally oriented rows 157 in the upper structure 119 of the enclosure 110 employing another device and/or system, and the cell tray 155 is added after the inversion step, i.e., after Step 503, and before Step 504.

The intermediate assembly that includes the plurality of battery cells 121 arranged in the plurality of longitudinally oriented rows 157 and contained in the upper structure 119 of the enclosure 110 is inverted (Step 503) and placed on a support structure such as a table so that it achieves a horizontally level state.

If not previously in place, the cell tray 155 is assembled onto the plurality of battery cells 121.

The inverted intermediate assembly that includes the plurality of battery cells 121 contained in the upper structure 119 of the enclosure 110 is filled with the potting compound 126 when in its liquified form (Step 504). In the uncured state, the potting compound 126 is a low viscosity, liquified, self-leveling substance that readily flows to the entire portion of the inverted intermediate assembly, thus encapsulating the upper portions of the plurality of battery cells 121. In one embodiment, the potting compound 126 is filled to a level that is even with a horizontal plane that is defined by the cell tray 155. In one embodiment, this may leave the bottom portions 128 of the plurality of battery cells 121 exposed. In one embodiment, the bottom portions 128 of the plurality of battery cells 121 may be encased in the potting compound 126. In both embodiments, the level of the potting compound 126 does not include or encapsulate the plurality of second ridges 156 of the cell tray 155 that are projecting upwardly when the intermediate assembly of the rechargeable energy storage system 100 is in the inverted state.

During the filling of the enclosure 110, the fill level of the potting compound 126 is regularly inspected to verify that the fill level achieves its intended level across the intermediate assembly (Step 505). Inspecting the fill level may be accomplished using visual inspection methods, including one or more of operator visual inspections and inspections by one or multiple vision systems.

When the fill level of the potting compound 126 achieves its intended level across the intermediate assembly, the potting compound is subject to curing (Step 506).

After the curing step is completed (Step 506), the bottom structure 118 is sealably assembled onto the intermediate assembly (Step 507), and the resultant rechargeable energy storage system 100 is re-inverted to achieve its in-use orientation (Step 508) and for further assembly processing.

Assembling the bottom structure 118 onto the upper structure 119 of the enclosure 110 forms a plurality of longitudinal channels 158 between the bottom portions 128 of the plurality of battery cells 121 and the bottom structure 118. Each of the plurality of longitudinal channels 158 corresponds to one of the plurality of longitudinally oriented rows 157, has a width that is equivalent to a diameter of one of the battery cells 121, and has a height that is equivalent to a height of the plurality of second ridges 156 of the cell tray 155.

Each of the plurality of longitudinal channels 158 enables channeling of vented gas from one or more of the battery cells 121 to the vent 159.

As described herein, the battery design provides a hybrid orientation of the electrical system and thermal system to enable more efficient cell integration and meet energy and allowable packaging dimensions.

The battery design enables efficient packaging of the battery cells in the vehicle lateral dimension and allows flexibility of total cell count in the pack.

The dual longitudinal serpentine electrical bussing design may facilitate a packaging efficient repeating interconnect board and sense line assembly, reduces bussing/wire length to a battery disconnect unit (BDU) for mass reduction and packaging efficiency, and improves electromagnetic compatibility by symmetric design.

The BDU header design for connection of the busbars to the BDU may enable easy assembly, efficient packaging space, and sealing functions to the BDU.

The thermal system may enable efficient pack integration and thermal hardware low-profile design employing dual ribbon cooling, reduction of the number of seals, efficient manifold sizing, easy assembly and scalability for alternative pack length and cell heights.

The process and associated battery described herein provide an assembly process for a rechargeable energy storage system 100 that includes an inverted potting filling process which enables improvement in managing a thermal runaway event. This concept may also provide significant mass reduction and improved structural rigidity.

The separation of the battery pack into clean and dirty zone, where the dirty zone contains cell vent gas during a thermal runaway event, and the sensitive components such as the high-voltage bus are only located in the clean zone, where gases cannot enter.

The process and associated battery described herein provide a location of the potting zone to reduce overall space needed to thermally protect sensitive components which may result in overall lower vertical height required for the battery pack.

The process and associated battery described herein enable gravity fill of potting with location of cell venting towards ground in vehicle orientation. This results in directional venting away from passengers.

The process and associated battery described herein may facilitate efficient pack integration and thermal hardware low-profile design. The design enables dual ribbon cooling, reduction of the number of seals, efficient manifold sizing, easy assembly and scalability for alternative pack length and cell heights.

The process and associated battery described herein provide novel pack design without extra sealing and baffling components, thus reducing packaging complexity, cost and mass. The potting process provides a partial potting fill for insulation and isolation of elements of the rechargeable energy storage system 100 from a thermal runaway event and provides separation of nominally clean and dirty gas zones.

The process and associated battery described herein enable application of adhesive to structural layers of the battery pack.

The process and associated battery described herein provide longitudinal channels running fore and aft to vent gases, with individual cell row channels that reduce adjacent cell heat transfer.

The process and associated battery described herein provide longitudinal channels running fore and aft with thermal runaway detection sensors, which may result in rapid thermal runaway detection and vent gas exiting the pack.

The process and associated battery described herein provide inverted potting fill, which eliminates the need for additional sealing and baffling components.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which may be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

While the best modes for carrying out the disclosure have been described in detail, those familiar with the art to which this disclosure relates will recognize various alternative designs and embodiments lying within the scope of the appended claims. It is intended that the matter contained in the above description and/or shown in the accompanying drawings shall be interpreted as illustrative only and not as limiting.

What is claimed is:

1. A rechargeable energy storage system, comprising:
an enclosure, the enclosure including an upper structure, a bottom structure, and a vent;
a header, formed on a first end of the enclosure between the upper structure and the bottom structure;
a plurality of vertically oriented cylindrical electrochemical battery cells (battery cells), the plurality of battery cells being arranged in a plurality of longitudinally oriented rows in the upper structure of the enclosure, wherein each of the plurality of battery cells has an upper portion and a bottom portion;
a cell tray, the cell tray including a plurality of first ridges and a plurality of second ridges, the plurality of first ridges projecting vertically upwardly from the cell tray and disposed around the battery cells, the plurality of second ridges projecting vertically downwardly from the cell tray;
a potting compound, the potting compound encapsulating the upper portion of the plurality of battery cells within the upper structure of the enclosure;
wherein the bottom structure includes a planar sheet having a plurality of longitudinally oriented vertical ridges formed thereon;
wherein the plurality of longitudinally oriented vertical ridges of the bottom structure are joined to the plurality of second ridges projecting vertically downwardly from the cell tray to form a plurality of channels;
wherein the header is fluidly coupled to the plurality of channels; and
wherein the vent is fluidly coupled to the plurality of channels via the header.

2. The rechargeable energy storage system of claim 1, wherein each of the plurality of channels corresponds to one of the plurality of longitudinally oriented rows of the plurality of battery cells.

3. The rechargeable energy storage system of claim 1, wherein each of the plurality of channels is formed between the potting compound that encapsulates the upper portion of the plurality of battery cells and the bottom structure of the enclosure.

4. The rechargeable energy storage system of claim 1, wherein the potting compound comprises, in an uncured state, a low viscosity, liquified, self-leveling substance that is fabricated from one of polyurethane or silicon.

5. The rechargeable energy storage system of claim 1, further comprising:
the plurality of battery cells being arranged into a plurality of cell modules;
a plurality of end collectors arranged on first and second sides of the enclosure;
a positive device terminal and a negative device terminal;

an electric power bus arranged in a longitudinally oriented spine, wherein the electric power bus includes a plurality of first busbars and a second busbar;
wherein the plurality of first busbars, the second busbar, and the plurality of end collectors are arranged to electrically connect the plurality of cell modules in series between the positive device terminal and the negative device terminal; and
a thermal management system including first and second fluidic manifolds that are fluidly coupled to a plurality of longitudinally oriented heat exchange plates;
wherein the plurality of longitudinally oriented heat exchange plates physically contact a portion of an outer surface of the plurality of battery cells.

6. The rechargeable energy storage system of claim 5, comprising the plurality of first busbars, the second busbar, and the plurality of end collectors being arranged in a serpentine configuration to electrically connect the plurality of cell modules in series between the positive device terminal and the negative device terminal.

7. The rechargeable energy storage system of claim 5, further comprising a plurality of cell monitoring controllers arranged to monitor the plurality of cell modules; wherein each of the plurality of cell monitoring controllers is arranged to monitor electrical parameters and environmental parameters of a respective one of the plurality of cell modules.

8. The rechargeable energy storage system of claim 5, further comprising the battery cells of one of the plurality of cell modules being arranged into a plurality of subsets that are arranged in parallel, wherein one of a plurality of longitudinally oriented collectors is arranged to electrically connect a first of the plurality of subsets of the battery cells to second of the plurality of subsets of the battery cells.

9. The rechargeable energy storage system of claim 5, further comprising the plurality of longitudinally oriented heat exchange plates physically contacting the portion of the outer surface of the plurality of battery cells to thermally couple to the plurality of battery cells.

10. The rechargeable energy storage system of claim 5, wherein the plurality of longitudinally oriented vertical ridges formed in the bottom structure correspond to the plurality of longitudinally oriented heat exchange plates.

11. A vehicle, comprising:
a rechargeable energy storage system electrically connected to an electric drive system coupled to a propulsion unit;
wherein the rechargeable energy storage system includes:
an enclosure, the enclosure including an upper structure, bottom structure, and a vent;
a header, formed on a first end of the enclosure between the upper structure and the bottom structure;
a plurality of vertically oriented cylindrical electrochemical battery cells (battery cells), the plurality of battery cells being arranged in a plurality of longitudinally oriented rows in the upper structure of the enclosure, wherein each of the plurality of battery cells has an upper portion and a bottom portion;
a cell tray, the cell tray including a plurality of first ridges and a plurality of second ridges, the plurality of first ridges projecting vertically upwardly from the cell tray and disposed around the battery cells, the plurality of second ridges projecting vertically downwardly from the cell tray;
a potting compound, the potting compound encapsulating the upper portion of the plurality of battery cells within the upper structure of the enclosure;

wherein the bottom structure includes a planar sheet having a plurality of longitudinally oriented vertical ridges formed thereon;

wherein the plurality of longitudinally oriented vertical ridges of the bottom structure are joined to the plurality of second ridges projecting vertically downwardly from the cell tray to form a plurality of channels;

wherein the header is fluidly coupled to the plurality of channels; and wherein the vent is fluidly coupled to the plurality of channels via the header.

* * * * *